United States Patent [19]

Flores-Verdugo et al.

[11] Patent Number: 6,050,289
[45] Date of Patent: Apr. 18, 2000

[54] SPHERICAL VALVE FOR FLOW CONTROL OF PARTICULATE SOLIDS AND GASES

[76] Inventors: Marco Aurelio Flores-Verdugo, Diego de Arana 149, Col. Cumbres 4o Sector, Monterrey, Nuevo León 64610, Mexico; Ernesto Narváez-de-León, Ave. Mil Cumbres 4913, Col. Villa Mitras, Monterrey, Nuevo León 64170, Mexico; César Humberto Valdez-Chapa, Vasco Núñez de Balboa 301, Col. Cumbres 3o Sector, Monterrey, N. L. 64610, Mexico; Luis Lauro Alanís-Santos, San Francisco 2216, Col. Residencial Florida, Monterrey, Nuevo León 64810, Mexico

[21] Appl. No.: 08/811,908

[22] Filed: Mar. 5, 1997

Related U.S. Application Data

[60] Provisional application No. 60/012,867, Mar. 5, 1996.

[51] Int. Cl.[7] .................................................. F16K 49/00
[52] U.S. Cl. .......................... 137/340; 251/172; 251/175; 251/192; 251/315.13
[58] Field of Search .................................... 251/159, 157, 251/172, 192, 175, 367, 315.13, 315.16; 137/340

[56] References Cited

U.S. PATENT DOCUMENTS

| | | |
|---|---|---|
| 1,901,961 | 3/1933 | Grant . |
| 2,705,016 | 3/1955 | Saar ............................................. 137/1 |
| 2,733,912 | 2/1956 | Newcomb et al. ....................... 266/27 |
| 3,051,189 | 8/1962 | Pro ......................................... 137/242 |
| 3,158,172 | 11/1964 | Giovannetti, Jr. et al. ............. 137/340 |
| 3,272,474 | 9/1966 | Pro ......................................... 251/175 |
| 3,487,849 | 1/1970 | Vietorisz ................................. 137/340 |
| 3,528,448 | 9/1970 | Urban ..................................... 137/242 |
| 3,580,539 | 5/1971 | Van Scoy ................................ 251/159 |
| 3,601,511 | 8/1971 | Von Massenbach .................... 417/506 |
| 3,638,674 | 2/1972 | Forst et al. .............................. 137/375 |
| 3,710,808 | 1/1973 | Celada et al. ............................... 137/1 |
| 3,799,367 | 3/1974 | Grewer et al. ............................ 214/23 |
| 3,901,490 | 8/1975 | Kanbara et al. .......................... 266/20 |
| 3,916,940 | 11/1975 | Allen ...................................... 137/340 |
| 4,074,889 | 2/1978 | Engel ..................................... 251/298 |
| 4,130,268 | 12/1978 | Kojima et al. .......................... 251/298 |
| 4,137,935 | 2/1979 | Snowdon ................................ 137/242 |
| 4,195,655 | 4/1980 | Augsburger et al. ................... 137/340 |
| 4,292,992 | 10/1981 | Bhide' .................................... 137/340 |
| 4,295,633 | 10/1981 | Sigmon .................................. 251/172 |
| 4,498,498 | 2/1985 | Martinez-Vera et al. .............. 137/613 |
| 4,583,568 | 4/1986 | Yamakawa et al. .................... 137/240 |
| 4,660,593 | 4/1987 | De Langhe ............................. 137/340 |
| 4,932,432 | 6/1990 | Berchem ................................. 137/375 |
| 4,971,101 | 11/1990 | Becker et al. .......................... 137/375 |
| 5,123,439 | 6/1992 | Powers ................................... 137/375 |

FOREIGN PATENT DOCUMENTS

| | | |
|---|---|---|
| 0063959 | 11/1982 | European Pat. Off. . |
| 3124439A1 | 12/1982 | Germany . |

OTHER PUBLICATIONS

Powder Handling and Processing Magazine Article, vol. 5, Number 2, Jun. 1993, "Inflatable Seat Valves" by Micheal F. Crawley.

magazine article: "Inflatable Sent Valve" by Michael F. Crawley pp. 162–165 in "Powder Handling & Processing" vol. 5, No. 2, Jun. 1993, published by Trans Tech Publications, D–38670 Clausthal Zellerfeld, Germany.

"CLYDE Pneumatic Conveying" ("Brochure 1018U" ) 12 pages (see page 9) by Clyde Pneumatic Conveying Inc., P.O. Box 326, Milford, Ohio 45150, U.S.A.

*Primary Examiner*—A. Michael Chambers
*Assistant Examiner*—Paul Coryea

[57] ABSTRACT

A valve for feeding abrasive particulate material to, and removal of particulate material from a pressurized vessel, adapted to operate at temperatures above 500° C., comprises a valve structure wherein a single shutoff member of generally spherical shape performs both functions of shutoff the particulate material and the gas-tight sealing by means of a resilient inflatable circular seal element which engages the convex side of said shutoff member. Said seal element is inflated and cooled by a pressure regulated and continuously flowing stream of liquid water. The seal element is protected from being damaged at high temperatures by contacting it with the cooled shutoff member when the valve is closed and with a cooled circular extension of the shutoff member when the valve is open.

7 Claims, 7 Drawing Sheets

SPHERICAL VALVE FOR FLOW CONTROL OF PARTICULATE SOLIDS AND GASES

FIELD OF THE INVENTION

The present invention relates to a valve for feeding abrasive particulate material to and removal of particulate materials from a pressurized vessel and for providing an effective seal between different gaseous atmospheres and pressures at each side of said valve. A provisional application was filed on Mar. 5, 1996 (60/012 867).

Typical applications for the invention are for example processing of iron ore, direct reduced iron (DRI), coal and other particulate solid materials, processed under high pressures where effective isolation from the environment of gases such as hydrogen and carbon monoxide or other flammable gases must be provided. The invention can also be advantageously used in applications at low temperatures or in processes carried out under vacuum conditions or at very high temperature (above 500° C.).

BACKGROUND OF THE INVENTION

The need for valves operating in industrial environments processing abrasive particulate solids, for example in the production of reduced iron ores (DRI) and coal gasification, goes back for several decades. Up to date there have been a number of proposed valve designs and combination of valves addressed to find an effective and reliable operation of pressure bin locks but as of today no one of these valves has satisfied all technical requirements needed in these fields, particularly when the temperatures of the materials handled are above 500°C.

One previously proposed solution to this problem is disclosed in U.S. Pat. No. 2,733,912 to Newcomb et al. Newcomb illustrates a combination of a butterfly valve for solids stopping and a plug valve for gas sealing. This patent does not teach or suggest stopping the flow of particulate solids and gas sealing with the same blocking element, with a cooled inflatable seal, nor it is adapted for high temperature usage.

U.S. Pat. No. 1,901,961 to W. F. Grant discloses a rotary valve for controlling the flow of any fluid, such as liquids or gases, and is especially adapted for use in water ways and oil mains. The valve described by Grant comprises a pressure type sealing device made of a flexible material, which is actuated by hydraulic pressure or by pressure from other sources. The seal is inflated by pressure for sealing the valve at its closed position and the pressure is relieved before opening the valve. This patent does not teach or suggest the application of the valve for controlling particulate solids nor its application at high temperatures with flammable gases under pressure. Grant does not provide a valve structure for suitable flow of solid particles because the shape of the blocking element 13 would not cut the solids flow but would get stuck when the flow channel is full of solids. This valve was conceptualized and can be used for handling fluids only.

U.S. Pat. No. 3,799,367 to Grewer et al. describes a discharge system for a shaft-type furnace which comprises a flap-type valve for stopping flow of particulate solids. This patent however does not provide an effective seal because it relies on metallic surfaces for such sealing and these surfaces can be easily scrapped and abraded by the solid particles passing through the valve.

U.S. Pat. No. 4,130,268 to Kojima et al. shows a valve structure for powdery or granular material where a single valve member has a dual function of shutoff the flow of granular material and also shutoff gas pressure. The shutoff valve member has an arcuate shape acting against the flow of solids on the concave side of said arcuate member. The gas sealing function is done on the convex side of the arcuate member. This valve structure has the disadvantage that the sealing surface of the casing (25) is abraded as the particles are deviated from their vertical free fall by the shutoff member (22) when closing the valve. This patent is mute about handling granular solids at high temperatures being restricted to applications at ambient temperatures.

U.S. Pat. No. 4,137,935 to Snowdon describes a valve assembly for closing and sealing an inlet which is full of large granular material wherein the shutoff of solid particles and the gas seal is effected by a single dome shaped member wherein both functions are made on the convex side thereof. The gas-tight seal is made by the metallic surface of the dome shaped element and an inflatable resilient circular element. The sealing element is protected against abrasion by solid particles by its position out of the possible gravitational flow of particles. The sealing surface of the dome shaped member which could get abraded does not present a sealing problem because the resilient sealing element when inflated is pressed against the metallic surface thus providing a very effective seal. This patent does not suggest any modification of the valve structure for applications at high temperatures, above 450° C. where the materials employed for construction of the sealing element would get damaged. Although some polymer materials have been found withstanding temperatures up to about 260° C., there are no commercially available valves for applications above said temperature.

OBJECTS AND SUMMARY OF THE INVENTION

It is therefore an object of the present invention to provide an improved apparatus for use in introducing granular abrasive materials at high temperatures into and removing them from a pressure or vacuum vessel, preferably by a single pressure valve (replacing dual ganged cut-off and pressure valve units).

It is another object of the invention to provide an improved apparatus for regulating the gravity feed of particulate iron ore to and from a pressure vessel, especially an iron ore reduction reactor.

Other objects of the invention will be in part obvious and in part pointed out hereinafter.

Accordingly a valve incorporating the present invention has several features which enable said valve to provide reliability and to lower the capital and maintenance costs thereof in processing plants The objects of the present invention are generally achieved by providing a valve comprising a cylindrical housing; a shutoff member having a generally spherical shape, rotatably mounted on a shaft within said housing; said shutoff member having a passage therethrough and being movable from a closed position where said particulate solids are prevented from passing through said passage, to an open position where solids and gases pass through said valve; an inflatable sealing ring engaging with the spherical surface of said shutoff member when said shutoff member is in its closed position for establishing a gas-tight seal between the inlet and outlet of said valve, pressurizing means for deforming said seal ring and actuating means for moving said shutoff member between its open and closed position

BRIEF DESCRIPTION OF THE DRAWINGS

In this specification and in the accompanying drawings, some preferred embodiments of the invention are shown and described and various alternatives and modifications thereof have been suggested; but it is to be understood that these changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
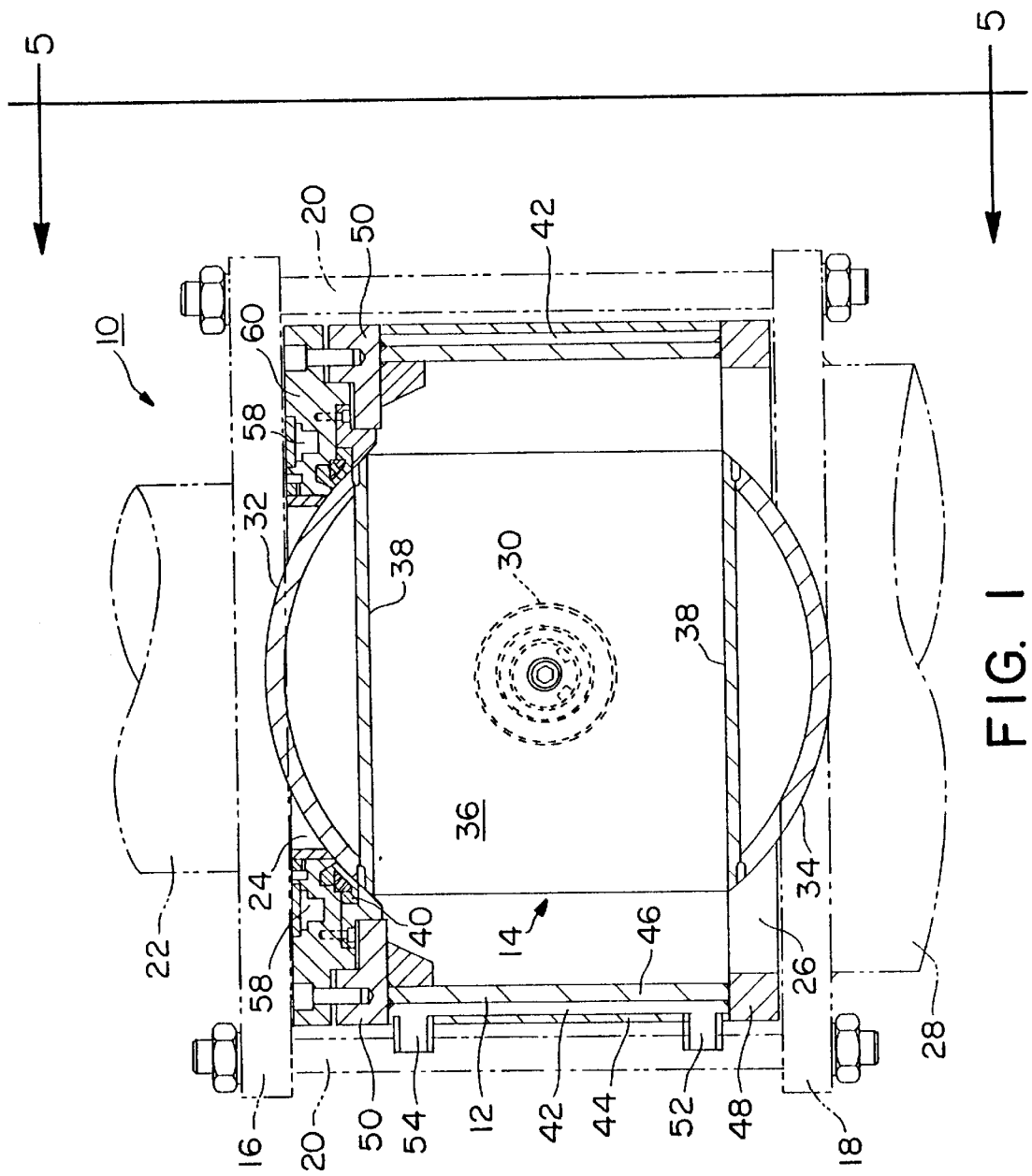
FIG. 1 is a partially schematic vertical section of a valve illustrating a preferred embodiment of the invention with the shutoff member in the closed position (with the installation assembly and associated piping being shown in dash-dot outline)
Figure 2:
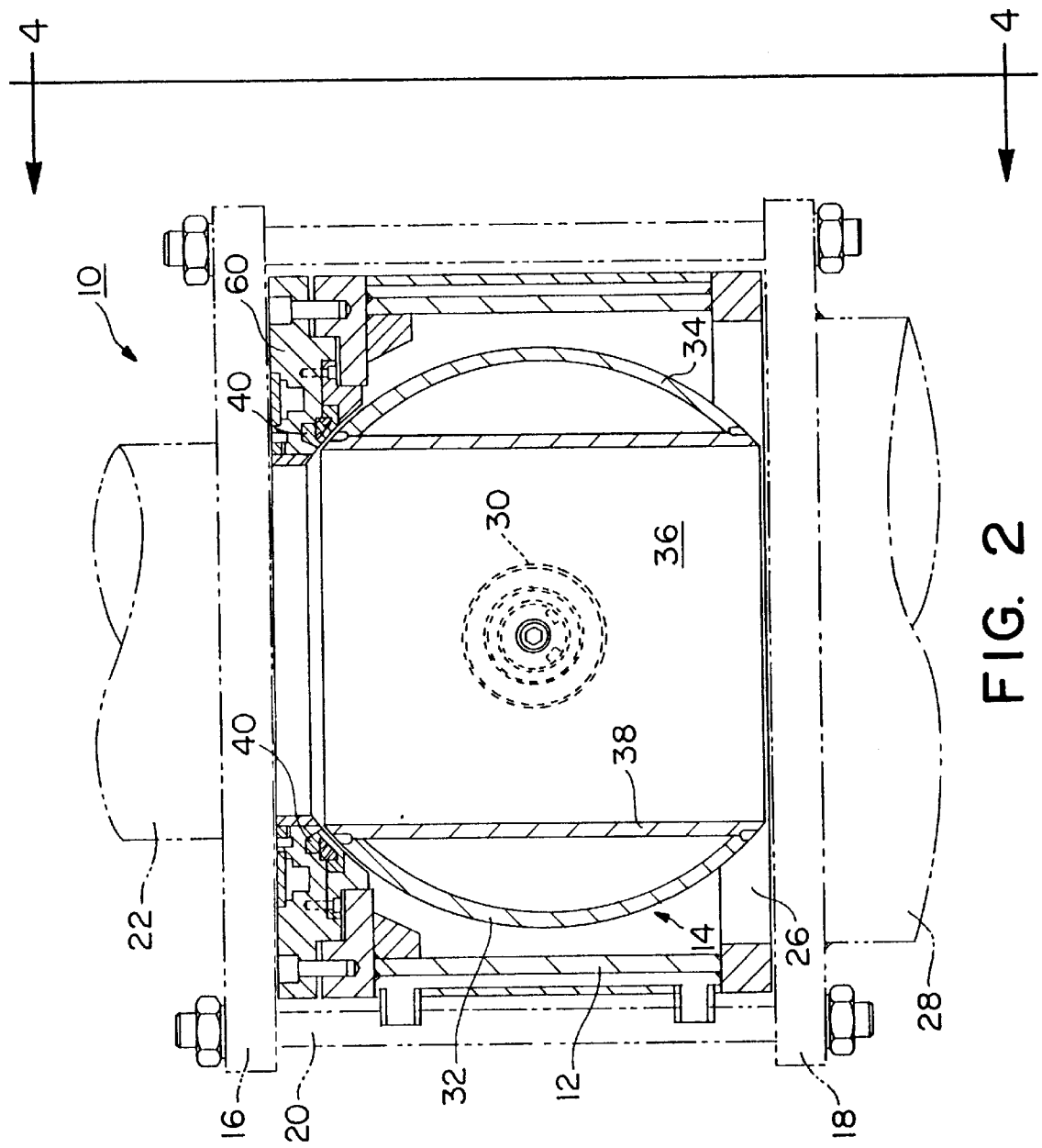
FIG. 2 is the same view in FIG. 1, except illustrating the shutoff member in the open position.

Although the invention will be described as applied to direct reduction reactors, as one of the preferred applications of the invention, it will be evident to those skilled in the art that in the broader aspects of the invention it can be utilized and provide advantages in other similar applications of industrial processes at low and high temperatures and pressures above and below the atmospheric pressure, particularly for handling abrasive particles.

Referring to FIGS. 1, 2, 3, 4 and 5, which illustrate different views of the valve and where like numerals designate like elements of its structure, numeral 10 generally designates a valve according to the invention for applications of cold and high temperatures in a direct reduction reactor system, comprising a housing 12 and a rotatable shutoff member 14. The valve 10 is illustrated as adapted for installation between an upper flange 16 and a lower flange 18 and is fixed in its working position by suitable fastening means, for example a set of bolts 20. A feeding pipe (or prior vessel outlet) 22 registers with inlet 24 of the valve; and an outlet 26 of the valve registers with discharge pipe (or subsequent vessel inlet) 28. The shutoff member 14 has a general spherical shape in its sealing surfaces 32 and 34, and has an internal passage 36 defined by a cylindrical wall 38.

The valve is provided with cooling passages both in the housing and the shutoff member for those applications of the valve where the materials handled are at high temperatures, for example in the production of hot Direct Reduced Iron (DRI), or in coal gasification. The housing is cooled by a circulating liquid, usually water, through a heat exchange jacket 42, formed by concentric cylindrical walls 44 and 46. Water is caused to circulate through cooling jacket 42 entering through inlet 52 and exiting through outlet 54. A circular lower member 48 and an upper member 50 close off the ends of said cooling jacket 42 and constitute therewith the housing 12 of valve 10.

Figure 4:
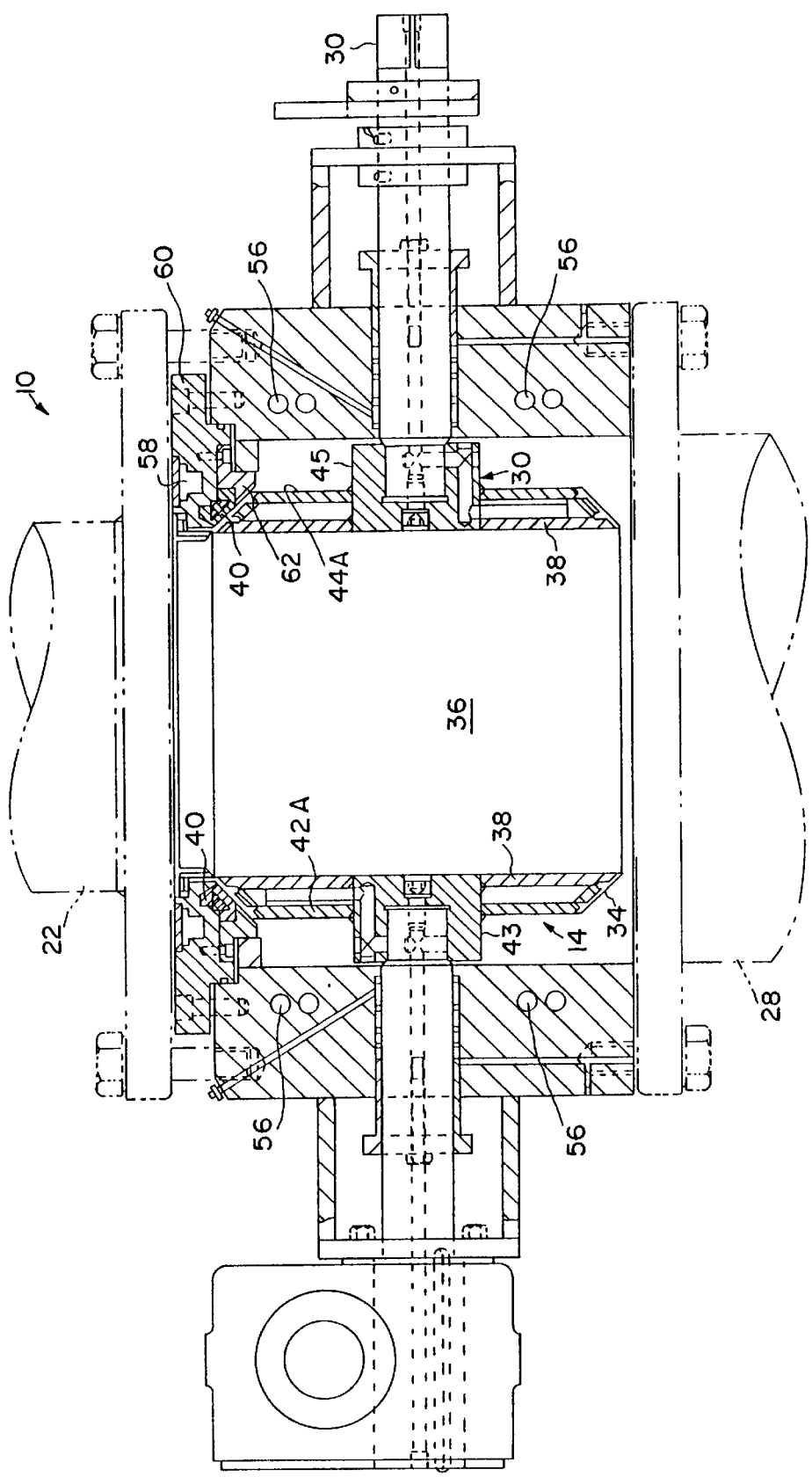
FIG. 4 is a partially schematic vertical section of the valve in FIG. 2, taken in the direction of the arrows on line 4—4 shown in FIG. 2 (thus being viewed at right angles to the view in FIG. 2)
Figure 5:
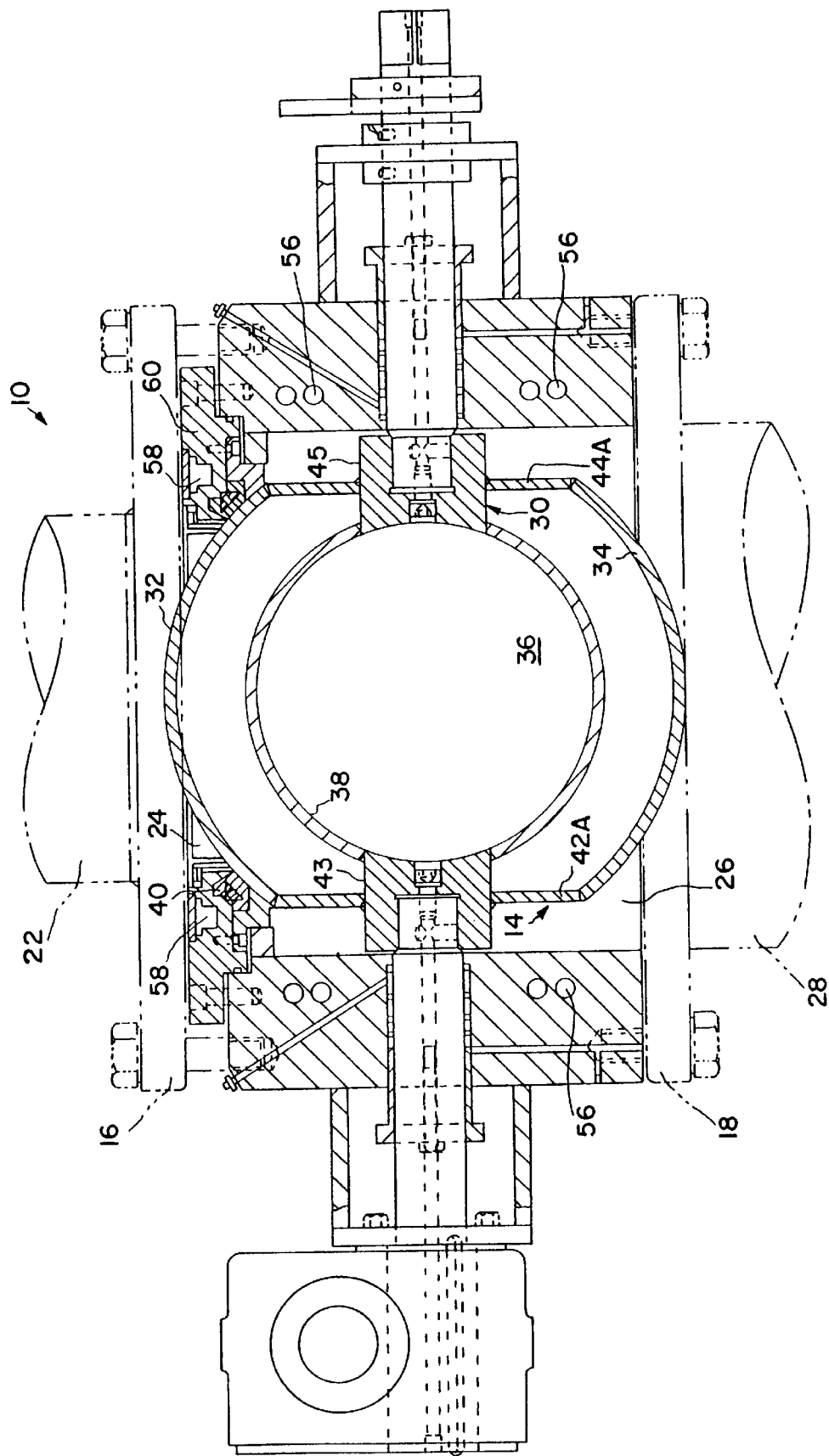
FIG. 5 is a vertical section taken in the direction of the arrows on lines 5—5 shown in FIG. 1, and is the view as in FIG. 4, except illustrating the shutoff member in the closed position.

Referring to FIGS. 4 and 5 where the valve is viewed as a vertical section (perpendicular to the sectional view in the prior figures, and taken as though along the direction of the shaft 30), cooling passages 56 are provided for circulating water therethrough (for cooling the end wall portions of the housing 12 supporting the shaft 30 and for communicating with the water jacket 42 around the valve housing). Passages 56 with suitable inlets and outlets of water (not shown for simplicity) are in a manner known in the art. Another circular passage 58 for cooling water is provided at the upper part of the housing in order to maintain the temperature of the top element 60 at an acceptable working temperature. The element 60 cooperates with another ring-shaped element 62 in order to fix in place a resilient sealing ring 40, which is expandable to engage to the spherical surfaces 32 or 34 of the shutoff element 14, for establishing therewith a gas-tight seal between the inlet and outlet of the valve (when the latter is closed).

Figure 3:
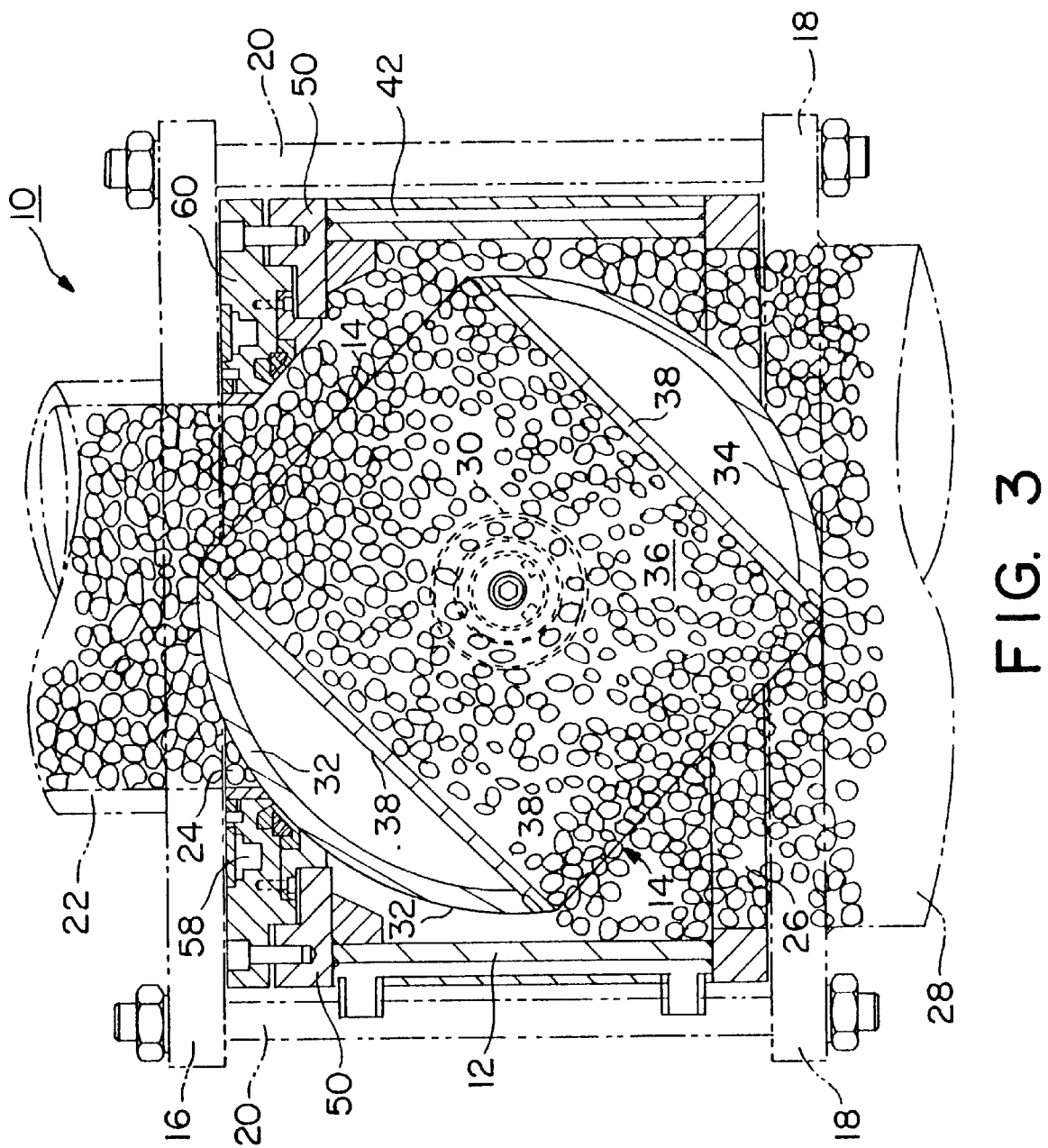
FIG. 3 is the same view as in the preceding figures except showing particles therein and with the shutoff member in an intermediate position between the open and closed positions (to illustrate the advantages of the spherical form of said shutoff member)

FIG. 3 shows the shutoff member 14 at an intermediate position when the valve is opening or closing. From this figure it can be appreciated the advantages of having a smooth spherical shutoff member 14 in contrast with the prior art valves where the shutoff member is dome shaped (as in U.S. Pat. No. 4,137,935) or has only one spherical sector or domed sealing surface. When the valve is full of solids, the shutoff member of the invention is much easier to move within the packed particles in the valve because the space for the rotation movement is already provided by the volume of the spherical shutoff valve. This has been proven in actual prototypes constructed with a dome shutoff (according to the patent) and with a full sphere (according to the present invention), when tested and the results compared. In the prior art valves, and particularly when the solid particles are hard and abrasive as is the case of iron ore and DRI, the opening and closing of the valve within a bed of particles requires much higher torque forces and requires stronger materials for the shaft of the valve than are needed for a valve constructed according to the present invention. The passage 36 provided within the shutoff member 36 guides the solids through the valve avoiding abrasion or wedging of the particles packed in other spaces within the valve. Another advantage of the spherical shape of the shutoff member is that said shutoff member can be rotated in either direction for opening or closing and is not limited to moving in only one direction for opening or closing, while the shutoff member of the applicants' valve can be operated to rotate in both directions if for some reason said shutoff member becomes stuck by particles which would cause wedging or sticking of said member within the housing. Another advantage of the invented valve is that the sealing element 40 which engages with the sealing surface 32 or 34 to provide a gas-tight seal, is protected from contact with abrasive particles and dust or from heat radiation caused by materials at high temperatures when in either the fully open or fully closed position (and is only partially exposed, and then only briefly during the transition between opening or closing).

Figure 6:
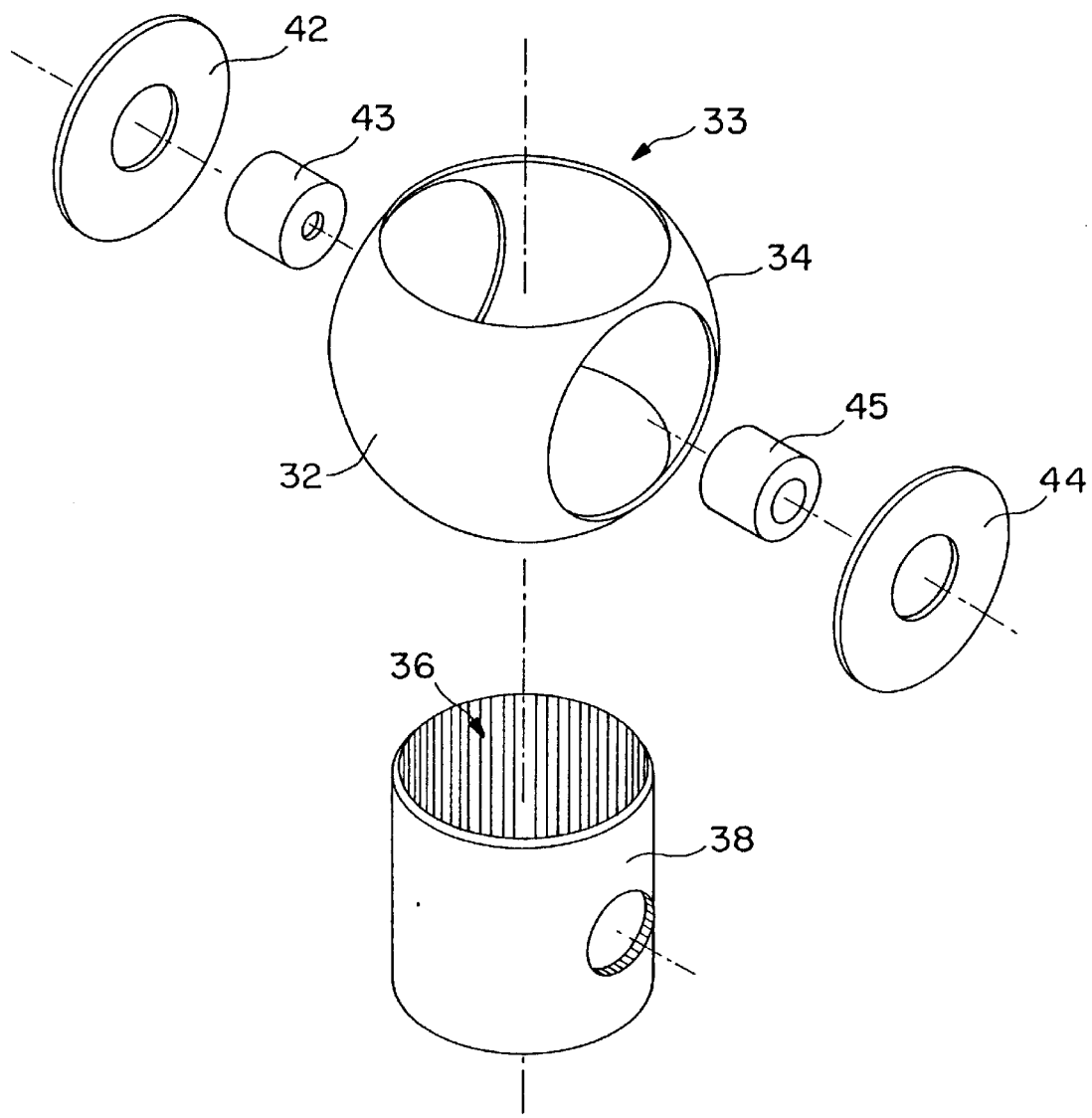
FIG. 6 is an exploded view of the shutoff member to illustrate its mechanical structure.

Referring to FIG. 6, a schematic exploded view of the shutoff element 14 is shown to illustrate the essential parts thereof. The basic component is a spherical member 33 which is welded to cylindrical member 38 to form the passage 36 for solid particles. Side flat circular plates 42A and 44A are welded to the spherical element 33 and two reinforcing shaft elements 43 and 45 are welded both to cylindrical element 38 and to flat plates 42A and 44A for greater mechanical strength of the shutoff element 14.

Figure 7:
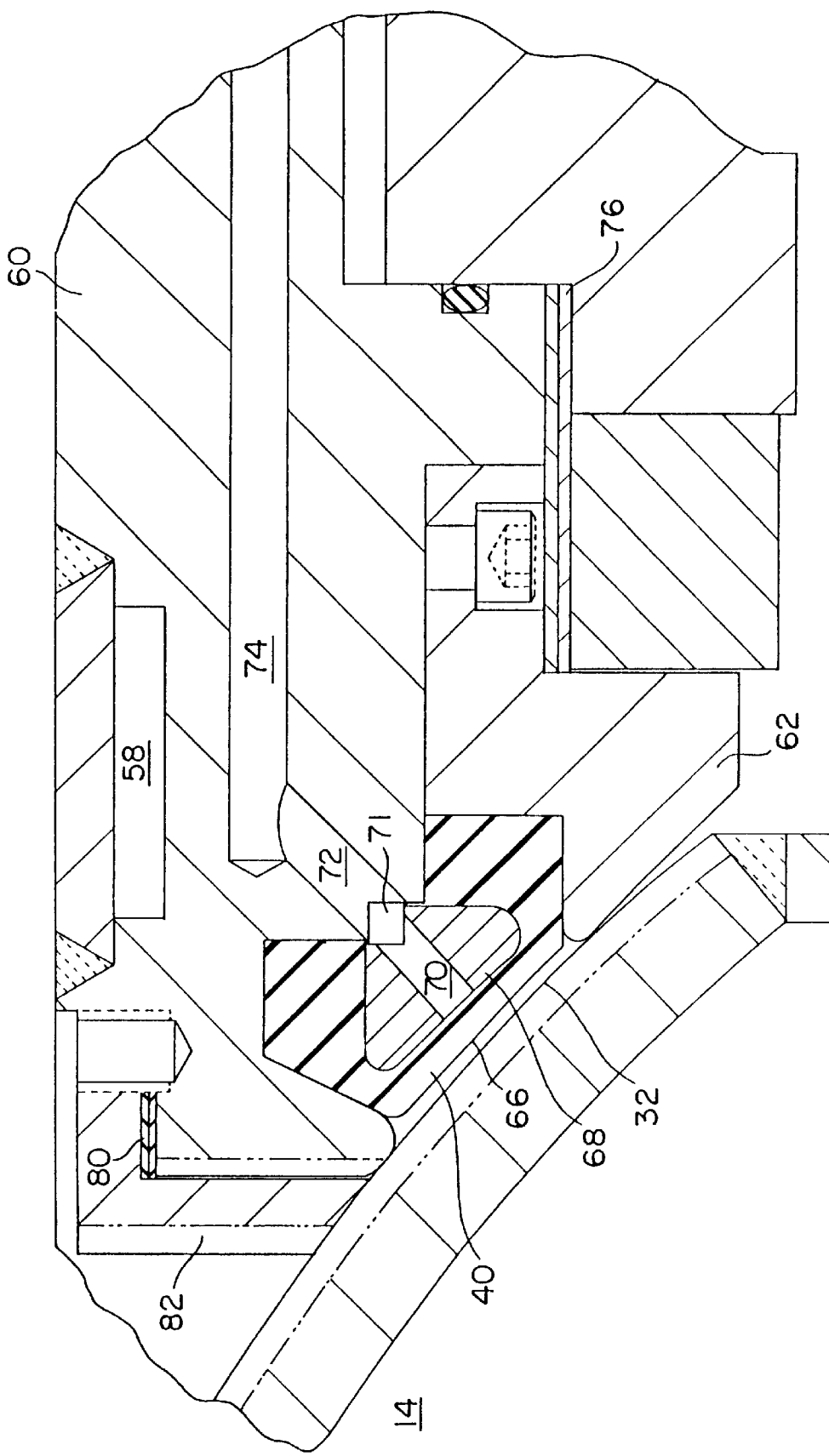
FIG. 7 is an enlarged detailed vertical section of the seal member area of the valve.

As illustrated in FIG. 7 with more detail, in a preferred embodiment of the invention, the sealing ring 40 is made of a resilient material which deforms by action of a fluid pressure in such a way that the sealing surface 66 of the sealing ring 40 is pressed against the surface 32 (or 34, depending upon which way the shutoff member 14 is rotated). A stiff member 68 is inserted within the sealing ring 40 in order to maintain its shape. At least one passage 70 is provided in said member 68 which communicates with passages 72 and 74 to inject a fluid, usually a gas to inflate the sealing element 40. In order to provide the adequate clearance between the surface of the shutoff element 32 or 34 and the surface 66 of the seal ring 40, a suitable amount of shims 76 may be inserted between the ring-shaped elements 60, 62 and the housing. Shims 80 are inserted for calibration of the clearance between protecting ring 82 and the shutoff element 14. When the valve 10 is to be opened, the fluid pressure in 70 is released and the seal is eliminated, thus protecting the sealing surface 40 from abrasion by the particulate materials passing through the valve. Yet even in the open position, the cooling water flowing through the inner passages of the shutoff member 14 (i.e. between the spherical member 33 and the cylindrical wall 38) protects the sealing ring 40 by covering such ring 40 (see FIG. 2). The fluid to operate the seal 40 may be air or any other gas compatible with the materials being handled through said valve to avoid damage of said materials in the event that there is a leak of pressurized gas from said seal ring. For high temperature applications, the preferred fluid for inflating the seal ring may be water, which also may serve as coolant for said ring (which can be caused to circulate along peripheral passage 71 provided for such purpose in member 68).

Referring to FIG. 7, in a preferred embodiment the cooling water, at a pressure of about 8 Kg/cm$^2$, is fed from a suitable source not shown through pipe 70 and is caused continuously to circulate through internal passage 71 of the circular seal 40, and is used to aid in maintaining the temperature of said seal within the allowable limits which the resilient polymeric material can withstand (typically up to about 400° C.) and also for exerting the necessary pressure to deform said seal and perform the sealing function. When the shutoff member 14 is in the closed position, the seal element 40 is inflated by restricting the flow of the exiting cooling water without interrupting its circulation. This process can be carried out for example by means of a combination of a cooling water valve and a calibrated orifice in a by-pass pipe. In order to deflate the seal, the cooling water valve is opened, while to inflate the seal the cooling water valve is closed whereby water is forced to pass through a flow restriction causing the pressure to build up within the seal, yet allowing the water flow to continue sufficiently to carry heat out of the seal.

For high temperatures applications, when cooling water circulates through the cooling passages of the valve, it is recommended to maintain the temperature of all the passages and surfaces which the water contacts, above the condensation temperature of the water at the operating pressure, to prevent water from condensing and forming deposits which may impair the efficiency of cooling or the smooth movement of the moving parts of the valve.

What is claimed is:

1. A valve for simultaneous regulation of the flow of particulate solids and gases comprising:

a valve body having a circular inlet with a spherically concave inner lip, and an outlet generally opposite to said inlet, respectively defining first and second valve body passages for said particulate solids and gases;

a solids blocking member having a central opening defining a third intermediate passage therethrough and further having at least a portion thereof in the shape of a sphere which portion is sized and positioned to be rotatable to extend in the closed position entirely across so as to block said circular inlet and additionally to spherically overlap the inlet's lip in both the open and closed positions so as to always be in close proximity at all times to such lip around its entire circumference thereby defining a sealing surface on the convex spherical surface of said portion of said solids blocking member, with said blocking member being rotatably mounted in said body for movement from a closed position where said blocking member prevents said solid particles from passing through said passage to an open position where the third passage of said blocking member is aligned with the first and second passages of said valve body;

a resilient fluid-inflatable sealing member extendable from a deflated position seated within a recess in said lip to an inflated position sufficient to engage and form a seal against said concave spherical portion of said blocking member within the entire overlap in either the open or closed position by the action of pressure from a fluid within said recess acting on said sealing member; and means for increasing and decreasing the pressure of the fluid to act on said sealing member, whereby when the pressure of said fluid is increased a gas-tight seal is formed between the sealing surface of said blocking member and said sealing member within the protection of said overlap, thus preventing said sealing member from becoming damaged by the effect of the high temperature of said hot particulate solids.

2. A valve according to claim 1, wherein said fluid for inflating said sealing member is water.

3. A valve according to claim 1, wherein said fluid for inflating said sealing member is natural gas.

4. A valve according to claim 1, wherein portions of said housing are hardened for protection thereof against abrasive wear by said particulate solids.

5. A valve according to any one of the preceding claims wherein the temperature of said sealing member adapted to handle the high temperatures of particulate solids above 400° C.

6. A valve according to claim 5, wherein the blocking member comprises a cooled ring area which contacts said seal when the blocking member is in the open position.

7. A valve according to claim 1, wherein said fluid for inflating said sealing member is caused to circulate along said sealing member for cooling down said sealing member.

* * * * *